United States Patent [19]

Kwech et al.

[11] Patent Number: 4,543,861
[45] Date of Patent: Oct. 1, 1985

[54] PORTABLE LATHE

[75] Inventors: Horst Kwech, Lake Bluff; Peter K. Olson, Buffalo Grove, both of Ill.

[73] Assignee: The E. H. Wachs Company, Wheeling, Ill.

[21] Appl. No.: 610,656

[22] Filed: May 11, 1984

[51] Int. Cl.⁴ .............................................. B23B 5/16
[52] U.S. Cl. ........................................ 82/4 C; 82/4 R
[58] Field of Search ................. 82/4 R, 4 C; 144/205

[56] References Cited

U.S. PATENT DOCUMENTS

| | | | |
|---|---|---|---|
| 3,772,944 | 11/1973 | Becker et al. | 82/4 C |
| 3,875,831 | 4/1975 | Beauloye | 82/4 C |
| 3,908,491 | 9/1975 | Gilmore | 82/4 C |
| 4,033,208 | 7/1977 | Gilmore | 82/4 C |
| 4,104,937 | 8/1978 | Breaux | 82/4 C |
| 4,130,034 | 12/1978 | Benoit | 82/4 C |
| 4,343,207 | 8/1982 | Paysinger | 82/4 C |
| 4,359,917 | 11/1982 | Wilger et al. | 82/4 R |
| 4,397,202 | 8/1983 | Mayfield et al. | 82/4 C |
| 4,463,633 | 8/1984 | Grimsley | 82/4 R |
| 4,483,223 | 11/1984 | Nall et al. | 82/4 C |

FOREIGN PATENT DOCUMENTS 173402  10/1982  Japan ..................... 82/4 C

OTHER PUBLICATIONS

Ser. No. 350,005, filed on 2/18/82, by E. H. Wachs and Horst Kwech.

*Primary Examiner*—Leonidas Vlachos
*Assistant Examiner*—Jerry Kearns
*Attorney, Agent, or Firm*—Wood, Dalton, Phillips, Mason & Rowe

[57] ABSTRACT

A portable lathe usable on site for preparing the end of a pipe preparatory to an operation, such as welding another pipe thereto, comprising a frame, a tool head carried by said frame and rotatable about an axis and having a tool post which movably mounts a tool slide for movement radially of said axis, and means for moving said tool slide including a feed cam on the frame, a clutch driven lead screw on the tool post, and a rigid link for transmitting motion imparted by said cam to said clutch.

5 Claims, 7 Drawing Figures

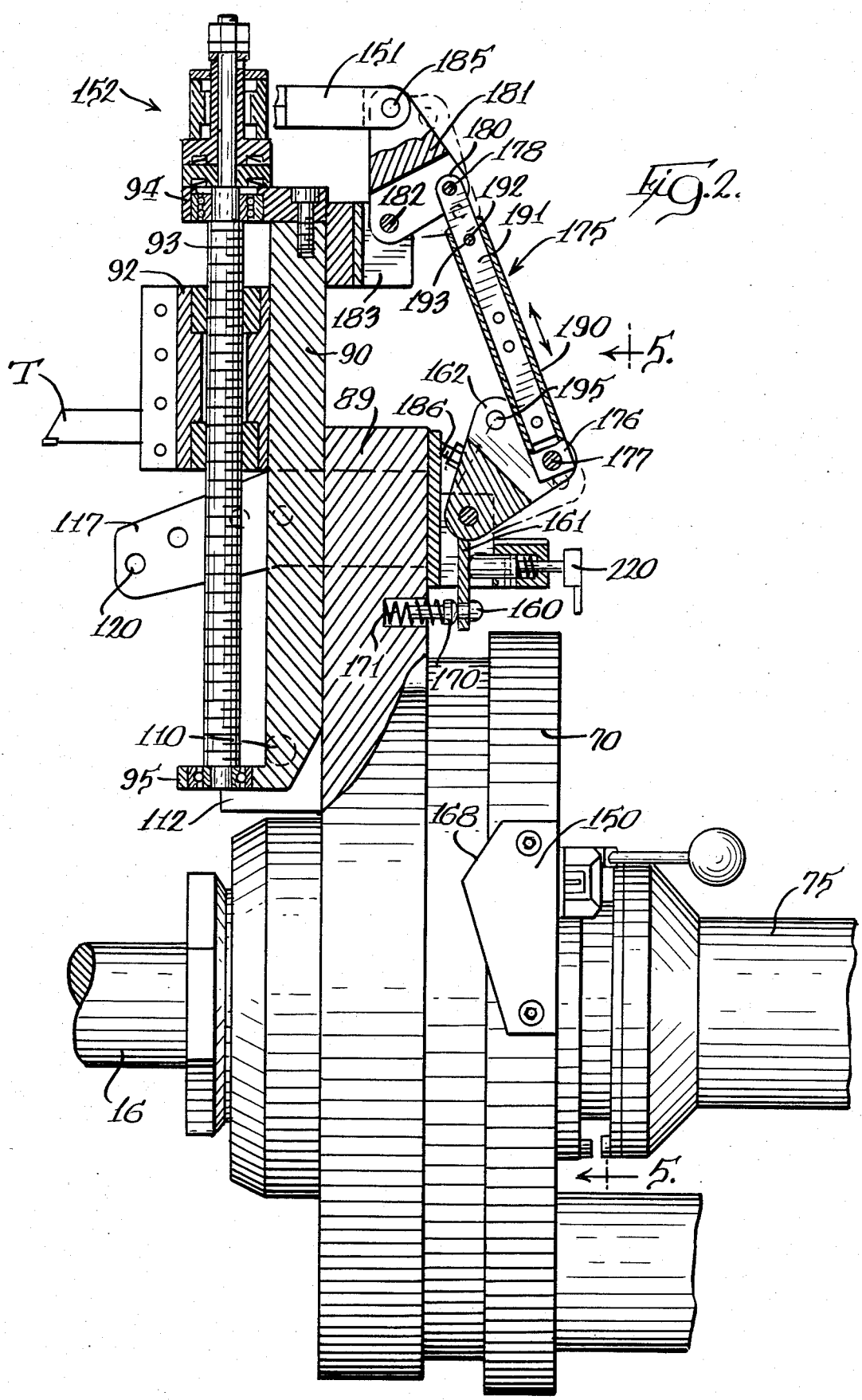

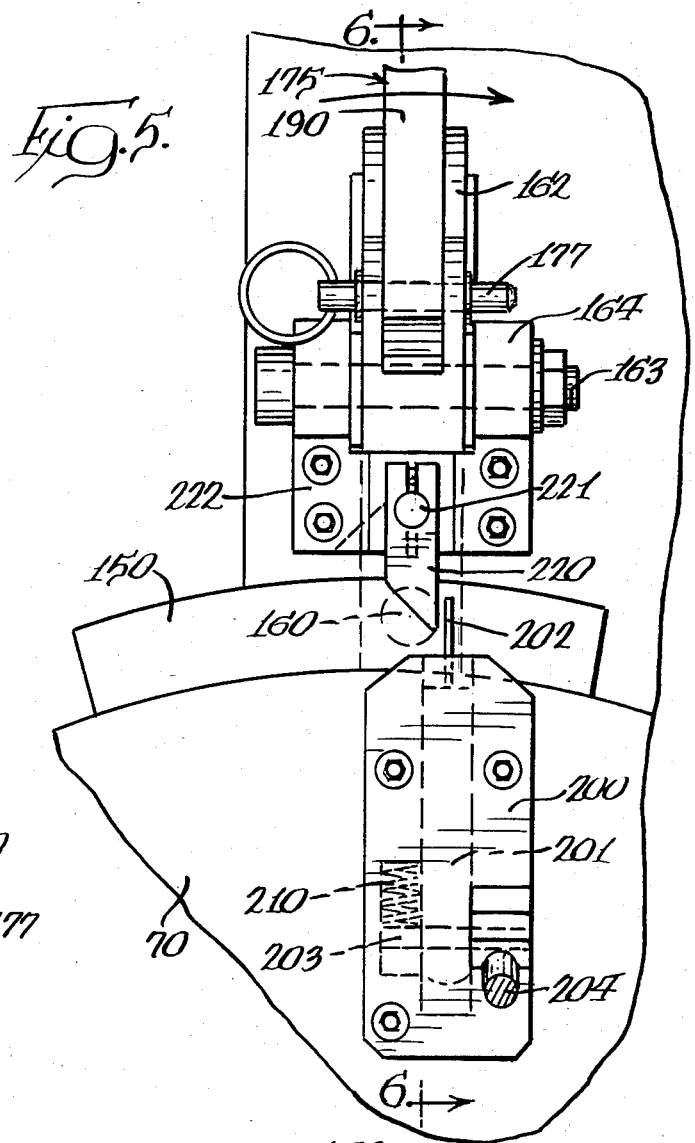
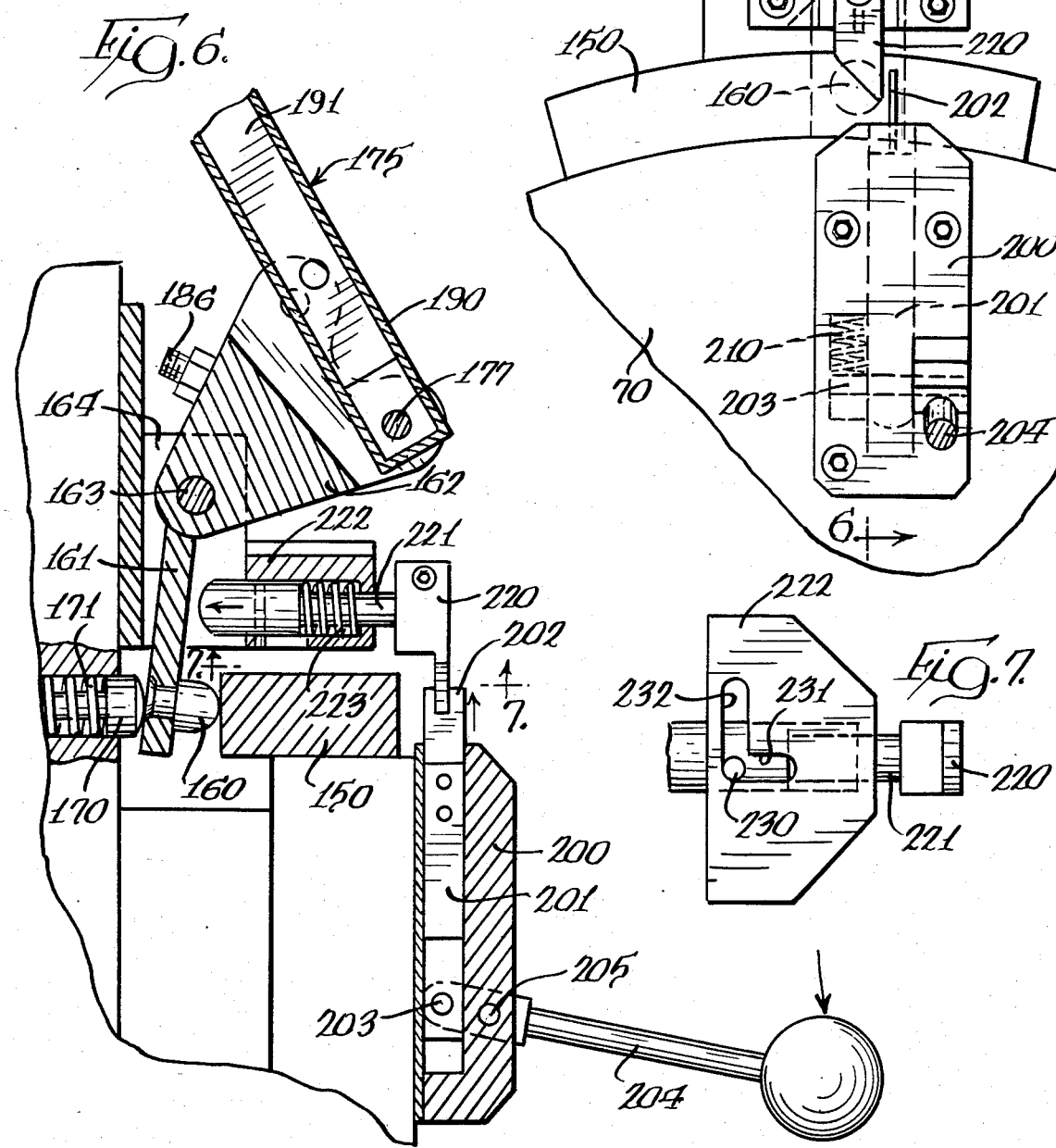
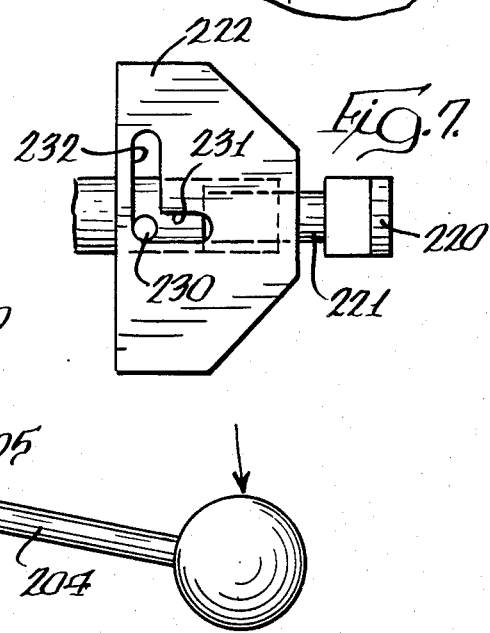

PORTABLE LATHE

BACKGROUND OF THE INVENTION

This invention pertains to a portable lathe usable on site for preparing the end of a pipe preparatory to an operation, such as welding another pipe thereto.

Many different forms of portable lathe are known in the art. A portable lathe embodies a frame which can be accurately secured to a pipe. A tool head rotatable on the frame has a tool slide with a tool which may be advanced during rotation of the tool head to perform a desired cutting operation on the pipe. The tool is advanced by means including a cam on the frame coacting with a cam follower carried on the tool head whereby contact of the cam follower with the cam during rotation of the tool head results in an incremental advance of the tool slide.

The motion of the cam follower has been transmitted to means associated with the tool slide for causing incremental movement thereof by various devices including a hydraulic line which delivers a pressure pulse to a hydraulic motor associated with the tool slide incremental advancing means or a Bowden wire which transmits the motion of the cam follower. The angle of the tool slide relative to the tool post can be varied in order to control the angle of the tool advance relative to the pipe end for setting a bevel cut on the pipe end. The hydraulic hose or Bowden wire is normally of sufficient length to accommodate the variation in the distance between the cam follower fixed to the tool head and the tool slide incremental drive means. The hydraulic hose or Bowden wire rotating with the tool head protrudes and can be hazardous to an operator of the lathe.

SUMMARY OF THE INVENTION

A primary feature of the invention is to provide a new, improved and safer construction of a portable lathe wherein an angularly adjustable tool slide mounted on a tool head which rotates on a frame has incremental drive means connected to a cam follower through a rigid link structure for a positive transmission of movement and which avoids the use of hoses or other devices which can be a safety hazard in use of the portable lathe.

The portable lathe has a tool head rotatably mountable on a frame attachable to a pipe with a tool post carrying a tool slide for movement toward the axis of tool head rotation to move a tool through a cutting cycle. The tool post is angularly adjustable relative to the tool head to various preselected angular positions for causing a tool to move at a desired angle relative to the end of the pipe, as for cutting a desired angle of bevel. The tool slide is moved relative to the tool post by drive means connected therebetween and with this drive means being operable by structure including a cam fixed to the frame of the machine and a cam follower rotatable with the tool head. Motion-transmitting means between the cam follower and the tool post includes a rigid link for positive transmission of motion without parts, such as hoses and wires, which could be a hazard to operator safety and with the rigid link having means associated therewith for adjustment in the effective length thereof corresponding to and as required for the angular adjustment of the tool slide relative to the tool post.

An object of the invention is to provide a portable lathe having a tool on a tool slide movably carried on an angularly adjustable tool post, with means for advancing the tool slide including a stationary cam and a cam follower rotatable with the tool post and with the cam follower being interconnected to means for advancing the tool slide by a rigid link and with means associated with the rigid link for varying the effective length thereof, dependent upon the angular adjustment of the tool slide relative to the tool post.

Still another object of the invention is to provide a portable lathe comprising, a frame, a tool head rotatably mounted on said frame, a tool post pivotally mounted on said tool head, a tool slide movable along the tool post, means for positioning the tool post at various angles relative to said tool head, and means for advancing said tool slide along the tool post in response to rotation of said tool head relative to the frame including a cam on said frame, a cam follower on said tool head, a tool slide feed means on the tool post, and a motion-transmitting connection between said cam follower and said tool slide feed means including a rigid link.

Still another object of the invention is to provide a portable lathe as defined in the preceding paragraph wherein the angles of the tool post relative to the tool head are preselected and result in placing the tool slide means at various distances from said cam follower and said means for varying the connection between the interconnected members of the rigid link includes a pin and openings in said interconnected members related for alignment to receive said pin and establish a length of said link corresponding to the variation in the distance between said cam follower and said tool slide feed means.

Still another object of the invention is to provide a portable lathe as set forth in the preceding paragraphs having new and improved means for discontinuing the advance of the tool and tool slide as the tool head continues to rotate including a manually movable member on the frame which deactivates the cam follower carried on the rotatable tool head.

BRIEF DESCRIPTION OF THE DRAWINGS

FIG. 1 is a perspective, elevational view of the portable lathe shown in association with an end of a pipe;

FIG. 2 is a fragmentary plan view of the portable lathe with parts shown in central, longitudinal section;

FIG. 3 is a fragmentary view, taken generally along the line 3—3 in FIG. 1;

FIG. 4 is a fragmentary view, similar to a part of FIG. 1, showing the mechanism in a different position of adjustment;

FIG. 5 is a fragmentary end view, taken generally looking in the direction of line 5—5 in FIG. 2 and with certain parts in a different relative rotative position;

FIG. 6 is a vertical section, taken generally along the line 6—6 in FIG. 5; and

FIG. 7 is a fragmentary view, taken generally along the line 7—7 in FIG. 6.

DESCRIPTION OF THE PREFERRED EMBODIMENT

The general construction of the portable lathe is the same as that shown in an application of E. H. Wachs and Horst Kwech, Ser. No. 350,005, filed Feb. 18, 1982, owned by the assignee of this application, and the disclosure thereof is incorporated herein by reference.

The lathe is shown in association with a pipe 10. The lathe, indicated generally at 15, has a mast 16 extending into the interior of the pipe and secured thereto in a concentric relation by means of a mandrel (not shown) and as particularly shown in the application referred to above.

Figures 1, 3, 4:
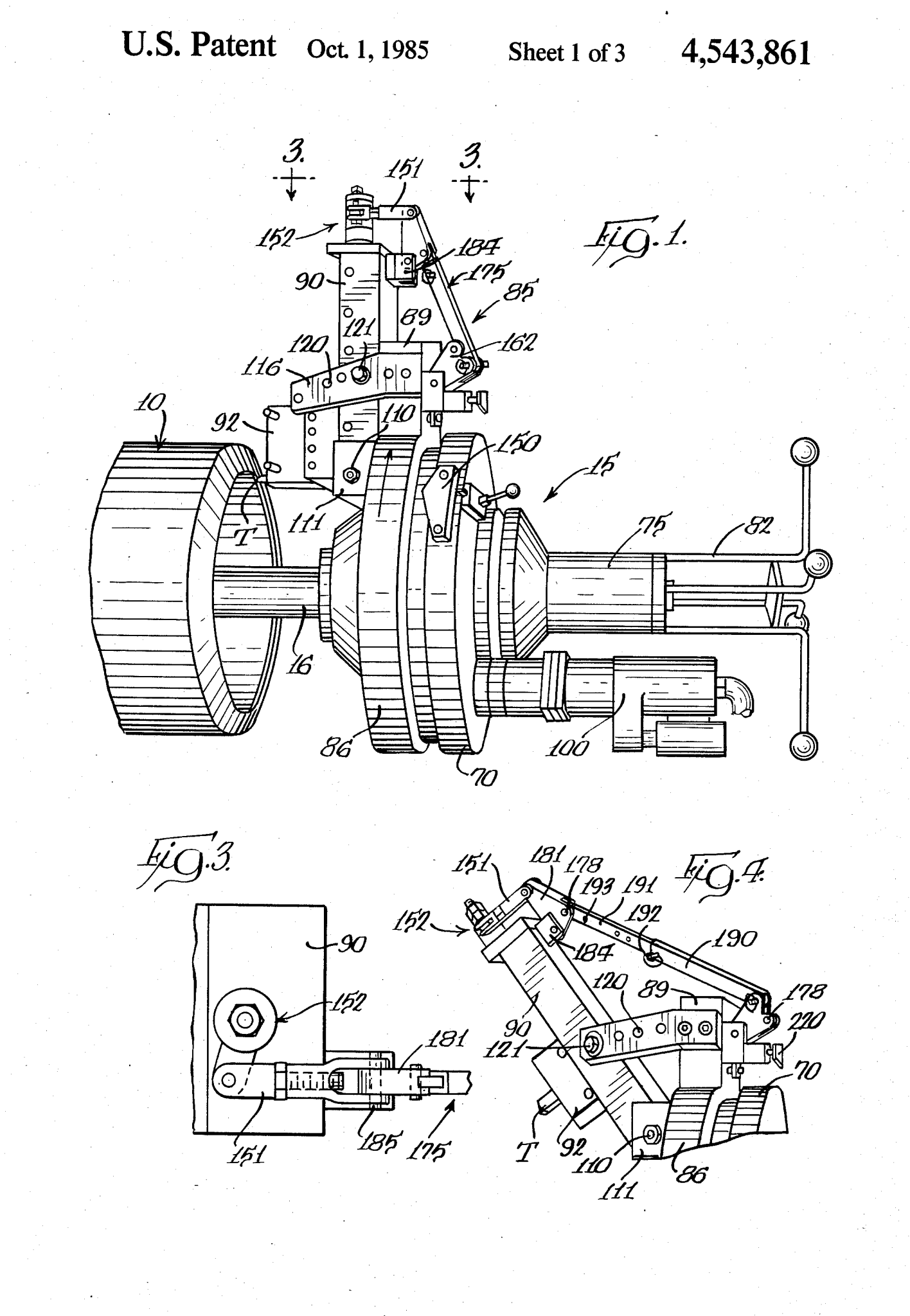

The lathe has a frame with a base plate 70 which can be moved axially of the mast 16 by rotation of a tubular member 75 and which houses coacting threaded elements associated therewith and with the mast. A handle structure including a plurality of rods 82 enable manual rotation of the tubular member 75 by an operator for advance of a lathe tool relative to the pipe 10. A tool head, indicated generally at 85, is rotatably mounted on the frame of the lathe and has an annular member 86 surrounding a frame element and rotatably mounted thereon by means of bearings (not shown). A radial arm 89 extending from the annular member 86 mounts a tool post 90 which movably carries a tool slide 92. The tool slide is movable along a path toward and away from the axis of the mast 16 which defines the axis of rotation of the tool head, with the movement of the tool slide being derived from rotation of a lead screw 93 rotatably mounted at its opposite ends in bearings carried by end plates 94 and 95 of the tool post 90. A tool T is, as shown in FIGS. 1 and 2, carried by the tool slide 92.

The tool head 85 is caused to rotate about the axis of the mast 16 and relative to the machine frame by means of a motor, such as a hydraulic motor 100, secured to the frame base plate 70 and which is drivingly connected to the tool head 85 through gearing particularly shown in the application referred to above.

As shown in FIGS. 1 and 2, the tool post 90 is positioned to lie parallel and in abutting relation with the tool head arm 89 whereby movement of the tool slide 92 is along a path which lies in a transverse radial plane relative to the mast 16. The tool post 90 can be positioned in any one of several different preselected angular positions, such as the extreme angular position shown in FIG. 4. The tool post 90 is pivotally mounted by a pivot pin 110 extending through a pair of blocks 111 and 112 secured to a face of the annular member 86 of the tool head and spaced apart to receive an inner end of the tool post 90 therebetween. A pair of bars 116 and 117 having an angular extent extend outwardly from the tool head arm 89 and form tool post supports. The tool post 90 has threaded openings on opposite sides which can align with one of a series of openings 120 in the tool post supports and threaded members, one of which is indicated at 121, extend through the openings in the tool post supports and thread into the openings in the sides of the tool post. Two different positions of the tool post 90 are shown in FIGS. 1 and 4. With the preselected angular positioning of the tool post, it is possible to perform automatic bevelling and the repeatability of the bevel angle is perfect due to the fact that the tool post is securely locked in position in openings which are set to establish predetermined angles of the tool post.

Although only a single tool post 90 is shown, it will be obvious from the disclosure in the application referred to above that the tool head can mount two tool posts of similar construction which would increase the metal removal rate.

The feed movement of the tool slide 92 is controlled by the selective mounting of one or more cams on the frame base plate 70 which coact with a cam follower rotating with the tool head. The rate of advance of the tool slide in one revolution of the tool head is dependent upon the number of cams positioned on the frame for contact by the cam follower as it revolves with the tool head as well as the depth of the cam surface.

As shown in FIGS. 1 and 2, there is a single cam 150 on the frame base plate 70 whereby, in each revolution of the tool head, an incremental advance is given to the tool slide 92. A cam follower and linkage structure, to be described, acts upon engagement with the cam 150 to transmit motion to a rod 151 which connects to a unidirectional clutch structure, indicated generally at 152. Each time the cam 150 is contacted, the rod 151 is moved toward the right, as viewed in FIG. 2, to operate the unidirectional clutch connected to the lead screw 93 for an incremental advance of the tool slide 92.

Referring particularly to FIGS. 2 and 6, a cam follower 160 is fixed to an arm 161 secured to a cam follower rocker arm 162 as by welding, with the cam follower rocker arm being rotatably mounted on a pin 163 mounted between a pair of blocks, one of which is shown at 164, and which are secured to the tool head 89. Cam follower 160 is urged into the path of the cam surface 168 on the cam 150 by a plunger 170 urged outwardly by a spring 171. As seen in FIG. 6, the cam 150 urges the cam follower 160 to the actuated position with resulting clockwise movement of the cam follower rocker arm 162 about the pin 163. This motion is transmitted to the rod 151 by a rigid link, indicated at 175, which has an end 176 pivotally connected to the cam follower rocker arm 162 by a removable pin 177 extended through an opening 178 (FIG. 4) of the cam follower rocker arm. An opposite end of the rigid link 175 is pivotally connected at 178 to a tool slide rocker arm 181 which is pivotally mounted on the tool slide by means of a pin 182 extended through an opening in the tool slide rocker arm and mounted to a pair of blocks on the tool slide, indicated at 183 and 184. The rod 151 is pivotally connected to the tool slide rocker arm 181 by a pin 185.

The cam follower 160 has the normal position shown in FIG. 2 as established by the stop 186. When the cam surface 168 of the cam 150 moves the cam follower 160, the rocker arms move to the broken line positions shown in FIG. 2.

The rigid link 175 and the associated rocker arms provide for positive transmittal of cam-actuated movement to the unidirectional clutch 152 and without any flexible parts, such as hoses or wires, which could catch on an operator and be a source of injury, particularly when such prior known components have to have an adequate length to permit adjustment of the tool post 90 to an extreme angle, as shown in FIG. 4.

The rigid link 175 has means associated therewith to enable adjustment of the length of the link as required for the angular adjustment of the tool post 90, with the length adjustments being directly related to the angular adjustment provided by the openings 120 in the bars 116 and 117. More particularly, the rigid link is formed of two parts, with an outer feed tube 190 having the end 176 which is pivotally connected to cam follower rocker arm 162 and which movably receives therein an inner link bar 191 which has the end 180 pivotally connected to the tool slide rocker arm 181. The inner link bar 191 has preformed, spaced openings selected to align with an opening in the outer feed tube and receive a removable pin 192. An opening 193 receives the pin 192 to define a minimum length for the rigid link 175, as shown in FIG. 2. Intermediate angular positions of adjustment of the tool post 90 bring into alignment other openings of the inner link bar with the opening in the outer feed tube to receive the removable pin 192. The maximum effective length of the link is shown in FIG. 4. Further length is obtained by having the link end 176 connected to a second opening 195 in the cam follower rocker arm 162 by the removable pin 177 and, as shown in FIG. 4, this also raises the link to avoid obstruction with the radial arm 89 of the tool head. The rigid link, in all set lengths, is always positioned close to the tool head to avoid interference with an operator.

Rotation of the tool head without advance of the tool T for finishing off the cut is accomplished by positioning the cam follower out of the path of the cam 150. Mechanism disclosed herein provides for deactivation of the cam follower by manual operation of structure which is not rotating and is mounted on the stationary frame base plate 70. This structure includes a mounting block 200 fixed to the face of the base plate 70 and which has an internal opening forming a guide for a movable slide 201 which carries a leaf spring 202 at its upper end and, at its lower end, is pivotally connected at 203 to a handle 204 rotatably mounted by a pin 205 to the mounting block. A spring 210 acts on the connecting pin 203 to urge the slide 201 to a normal lowered position wherein the leaf spring 202 is in a lowered position.

The handle 204 can be rotated in a clockwise direction by a force as applied in the direction of the arrow shown in FIG. 6 to raise the slide 201 against the action of the spring 210 to the position shown in FIG. 6. With the spring 202 positioned as shown in FIG. 6, it lies in the path of a trigger switch 220 mounted on a rod 221 rotatably mounted in a block 222 mounted to the blocks, one of which is identified at 164, and spanning a gap therebetween whereby an enlarged end of the rod 221 may contact the cam follower arm 161. The rod 221 is urged inwardly of the block 222 and into following relation with the cam follower arm 161 by a spring 223 having less force than the spring 171.

As shown particularly in FIG. 7, the rod 221 carries a laterally-extending pin 230 which coacts with an L-shaped slot in the mounting block 222. In normal operation, the spring 223 urges the rod 221 to follow the cam follower arm 161 with the pin 230 moving back and forth along an axially extending section 231 of the L-shaped slot. When the cam 150 has caused movement of the cam follower arm 161 to the position shown in FIG. 6, the spring 223 has moved the rod 221 to the left whereby the pin 230 is aligned with a transversely-extending section 232 of the L-shaped slot. If the leaf spring 202 is raised by operation of the handle 204, rotation of the tool head causes rotation of the trigger switch 220 by the leaf spring to move the pin 230 into the transverse section 232 of the L-shaped slot which locks the rod 221 against return movement. This causes the rod 221 to hold the cam follower arm 161 in the position shown in FIG. 6 whereby it cannot return to a position to again be pulsed by the cam 150 in the next revolution of the tool head 85.

With the cam follower disablement structure described above, an operator only need hold the handle 204 depressed to extend the leaf spring 202 and, when the tool head rotation brings the cam follower 160 onto the cam 150 and at the same time brings the trigger switch 220 into engagement with the spring 202, the rod 221 is rotated to cause the locking thereof by engagement of the pin in the transverse slot section 232. When it is desired to resume feeding of the tool T, the operator need merely rotate the rod 221 to free the pin 230 from the transverse slot section 232 and bring the pin back into alignment with the axial slot section 231 whereby the feeler mechanism merely cycles back and forth as the cam follower 160 contacts the cam 150 in each revolution of the tool head.

We claim:

1. A portable lathe comprising, a frame, a tool head rotatably mounted on said frame, means for rotating said toolhead, a tool post, means pivotally mounting said tool post on said tool head, a tool slide movable along the tool post, means for positioning the tool post at various angles relative to said tool head, and means for advancing said tool slide along the tool post in response to rotation of said tool head relative to the frame including a cam on said frame, a cam follower, means movably mounting said cam follower on said tool head, a tool slide feed means on the tool post, and a motion-transmitting connection between said cam follower and said tool slide feed means including a rigid link having two interconnected elongate members with one member connected at an end to the cam follower and the other member connected at an end to the tool slide feed means and with the members between said ends having their lengths associated together in overlapped sliding relation to vary the length of the link dependent on the overlap between the elongate members to accommodate said various tool post angles, and means for fixedly interconnecting said elongate members whereby the motion of the cam follower is transmitted through the link to the tool slide feed means to feed the tool slide.

2. A portable lathe as defined in claim 1 wherein the angles of the tool post relative to the tool head are preselected and result in placing the tool slide means at various distances from said cam follower and said means for varying the connection between the interconnected members of the rigid link includes a pin and openings in said interconnected members related for alignment to receive said pin and establish a length of said link corresponding to the variation in the distance between said cam follower and said tool slide feed means.

3. A portable lathe as defined in claim 2 wherein one of said link members is pivotally connected to said cam follower, and means on said cam follower defining two locations for said last-mentioned pivotal connection.

4. A portable lathe as defined in claim 1 including means for disabling the feed of the tool slide while the tool head continues to rotate including a rod, support means mounted on the tool head to movably support said rod, locking means on said rod and support means, means for urging the movable rod in a direction to follow the cam follower, means urging the cam follower into the path of the cam, a trigger switch on said rod, and a member on said frame having means to selectively move said member into the path of said trigger switch to rotate said rod into a locked position when said cam follower is on said cam in its fully actuated position to prevent movement of the cam follower.

5. A portable lathe as defined in claim 1 including deactivating means for deactivating the tool advancing means comprising, a member on the tool head movable to a position to hold the cam follower out of the path of the cam, and means including movable structure on the frame for locking said member in said position.

* * * * *